United States Patent Office 3,183,405
Patented May 11, 1965

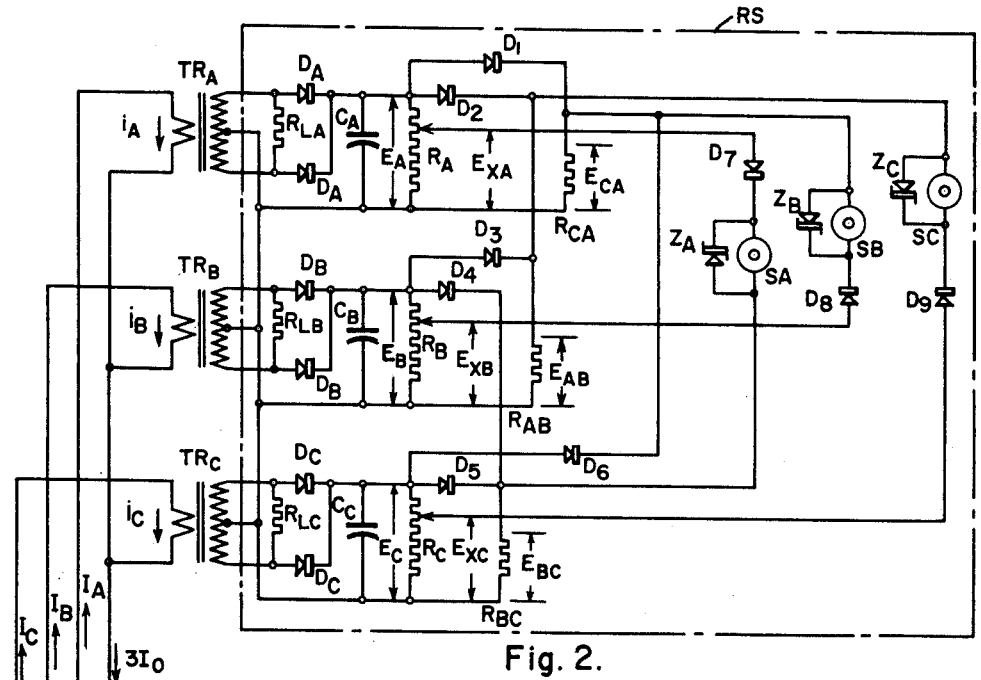
Fig. 2.
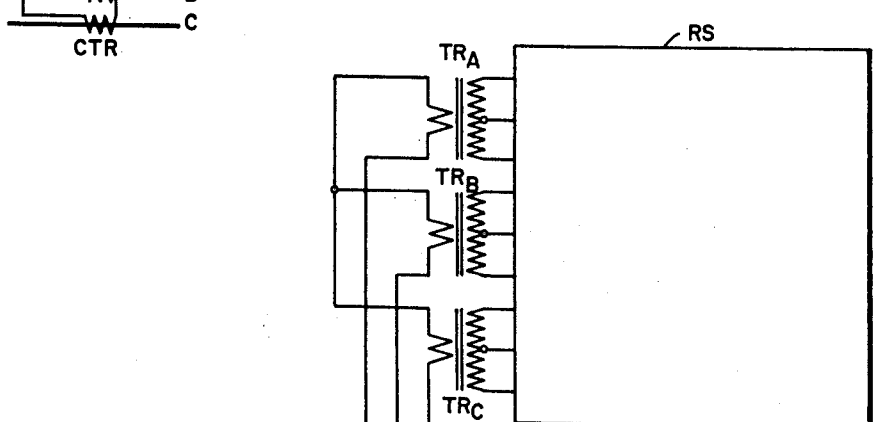
Fig. 3.
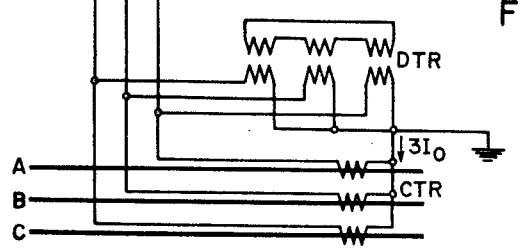

3,183,405
RELAYING ASSEMBLY
William K. Sonnemann, Roselle Park, N.J., assignor to Westinghouse Electric Corporation, East Pittsburgh, Pa., a corporation of Pennsylvania
Filed Feb. 24, 1961, Ser. No. 91,394
16 Claims. (Cl. 317—27)

My invention relates to a protective relaying system which uses polyphase-responsive elements energized from polyphase compensated bus-voltages at the relaying station for responding to fault conditions which include single-phase-to-ground faults.

This invention in one embodiment is directed to a polyphase relay wherein each of the phase energizing circuits of the relay is subject to modification in dependence on predetermined conditions. In a preferred embodiment of the invention these conditions are the specific phase or phases of a polyphase system protected by the relay which are faulted to ground. The invention also is directed to improved systems for selectively responding to single-phase-to-ground faults.

My invention is particularly suitable for a distance relay for the fault-protection of three-phase transmission-lines or power-lines by the use of a compensator or compensators connected in series with the bus-voltages at the relaying station, and energized from one or more of the line-currents, for deriving a set of compensated three-phase relaying voltages which reproduce some aspect of the line-voltages at some predetermined fault-location in the power-line or system, in combination with polyphase-responsive relaying means, energized from said compensated polyphase relaying voltages, for developing an operating component which is responsive to the magnitude of the negative-sequence component of said compensated three-phase relaying voltages, and a restraining component which is similarly responsive to the magnitude of the positive-sequence component of said compensated relaying voltages; or the relaying means may operate on the principle of a polyphase induction motor, energized from said compensated three-phase relaying voltages; or the relaying means may operate on the principle of a sine relay, energized from two of the phases of said compensated three-phase relaying voltages, for operating in response to the product of the magnitudes of said two phases, multiplied by the sine of the phase angle between them. The relay includes a provision for modifying the energization of the relaying means to enable it to respond to single-phase-to-ground faults on the protected lines. In a preferred embodiment of the invention the compensated polyphase relaying voltages are modified under single-phase-to-ground fault conditions by the introduction of a zero-sequence component derived from the line voltages at the relaying station and compensated by a factor derived from the line currents.

My invention also relates to the combination of a line or phase-fault relaying means $\phi\phi$, for responding to both grounded and ungrounded double-line faults LLG and LL and to single-phase-to-ground faults LG and a three-phase relaying means $3\phi$, for responding to three-phase line-faults, characterized by at least one of said relaying means being a polyphase-responsive relay which is energized from compensated voltages as above described. This fully protects the power-line against all kinds of multiple-conductor faults, or faults involving more than one of the line-conductors of the power-line. That is, my relaying assembly, as a whole, protects the power-line against all types of faults including single-line-to-ground faults LG.

More specifically, my invention also relates to a compensator phase-fault relay $\phi\phi$ in which a polyphase-responsive element is energized from the three-phase bus-voltages, each phase of which is compensated by, in effect, passing the corresponding line-current through a compensator which is a replica of the line-impedance to the desired balance-point of the relay, the three compensators being similar to each other, and being respectively connected between the corresponding phases of the bus-voltages and the corresponding phases of the element. In addition, for a single phase-to-ground fault a zero-sequence quantity is applied to that compensated phase voltage which corresponds to the faulted phase.

In one form of the invention, for a two-line-to-ground fault occurring on the protected line, a compensated zero-sequence-component of voltage, derived from the line at the relay station, is introduced in that phase of the compensated phase voltages which corresponds to the un-faulted phase of the line to improve the response of relay to such faults.

Still more specifically, my invention in one embodiment relates to compensated-voltage relaying units and systems of the general types just described, in which the polyphase-responsive element is a multipolar torque-producing element using a cylindrical rotor, the multipolar element preferably having four poles which are so energized as to produce two diametrically flowing fluxes, each flux being responsive to one of the two compensated voltages which are applied to said torque-producing element. Such a torque-producing element is known to combine the advantages of a high operating-torque, and a low inertia, which together spell a high rate of response and great sensitivity of response, in combination with the elimination of the objectionable double-frequency pulsating torques. Since such a two-flux torque-producing element is not a balanced three-phase element, its energizing connections should be such as to provide no flow of zero-sequence current in the torque-producing element, so as to eliminate hybrid torques which are responsive to the products of the zero-sequence current multiplied by each of the two rotational-sequence currents, namely the positive-sequence current and the negative-sequence current, respectively, which would shift the balance-point of the element.

My invention has many advantages, including a great reduction in the number of relaying elements which are necessary for the protection of the power-line in each of the three distance-zones, zone 1, zone 2 and zone 3, which are commonly used in distance-relaying. My invention also has an advantage resulting from the fact that the polyphase-response compensated-voltage distance-responsive relaying-elements are inherently directional, thereby avoiding the need for a separate directional element or means, and eliminating the contact-coordination problem which is entailed by the use of separate distance and directional elements. This inherent directional response is obtained both at the balance-points of the distance-responsive elements and at the relaying bus, or more exactly, at the location of the line-current transformers.

In all types of compensated-voltage distance-relays using the general principles of my invention, the relay-response is zero if the fault is located exactly at the balance-point of the relay; if the fault is nearer than the balance-point, the actual or modified negative-sequence component of the impressed relay-voltage is larger than the actual or modified positive-sequence component, and the relay produces response in the operating direction; but if the fault is beyond the balance-point, the actual or modified positive-sequence component is the larger, and the relay-response is in the restraining direction. But since the polyphase-responsive relaying element is very sensitive to small positive and negative-sequence components, the balance point can be set very accurately—much more acurately than has heretofore been achieved.

In the case of faults which are located close to the relaying bus, or, more exactly, close to the line-current transformers, it will be noted that the compensator-voltage will be in one direction if the fault is in front of the current-transformer, and will be in the opposite direction if the fault is behind the current-transformer. This reversal of the line-current usually produces a sudden discontinuity in the response of the polyphase-responsive element. In the case of my phase-fault relay $\phi\phi$, having three identical compensator-impedances, traversed by the respective line-currents, producing compensator-voltages which subtract from the respective phases of the bus-voltage, the line-currents are a maximum for a fault-location which is immediately in front of the line-current transformers, so that the relay-operating response is a maximum at this fault-location; but if the fault is located immediately back of the current-transformers, the compensator-voltages will add to the bus-voltages, making the positive-sequence relay-voltage component always much larger than the negative-sequence component, and the relay-response will suddenly be reversed, so that there will be no relay tripping response.

Other compensated relays, such as three-phase relays $3\phi$, use the general idea of subtracting one or more compensator-voltages from the bus-voltages, but not in a balanced fashion as in my phase-fault relay $\phi\phi$. Relay response is zero for fault near the line-potential transformers. This is because neither positive nor negative sequence voltage exist at the relay both having been short circuited.

When fault is some distance from potential transformers so that voltage drop exists from transformer to fault, then sequence voltage will be present.

With the foregoing and other objects in view, my invention consists in the apparatus, circuits, combinations and methods of operation, hereinafter described and claimed and illustrated in the accompanying drawing, wherein:

FIGURES 1A and 1B together represent a diagrammatic view of the best form of embodiment of circuits and apparatus, which I at present prefer for embodying my invention in a relaying equipment for protecting one terminal of a three-phase power-line against faults involving one, two or three phases of the line. To form the complete view FIG. 1A should be placed above FIG. 1B;

FIG. 2 is a diagrammatic view of a preferred embodiment of circuits and apparatus for energizing certain relays of FIG. 1A;

FIG. 3 is a diagrammatic view of a modification of the embodiment of FIG. 2;

Figure 1A:
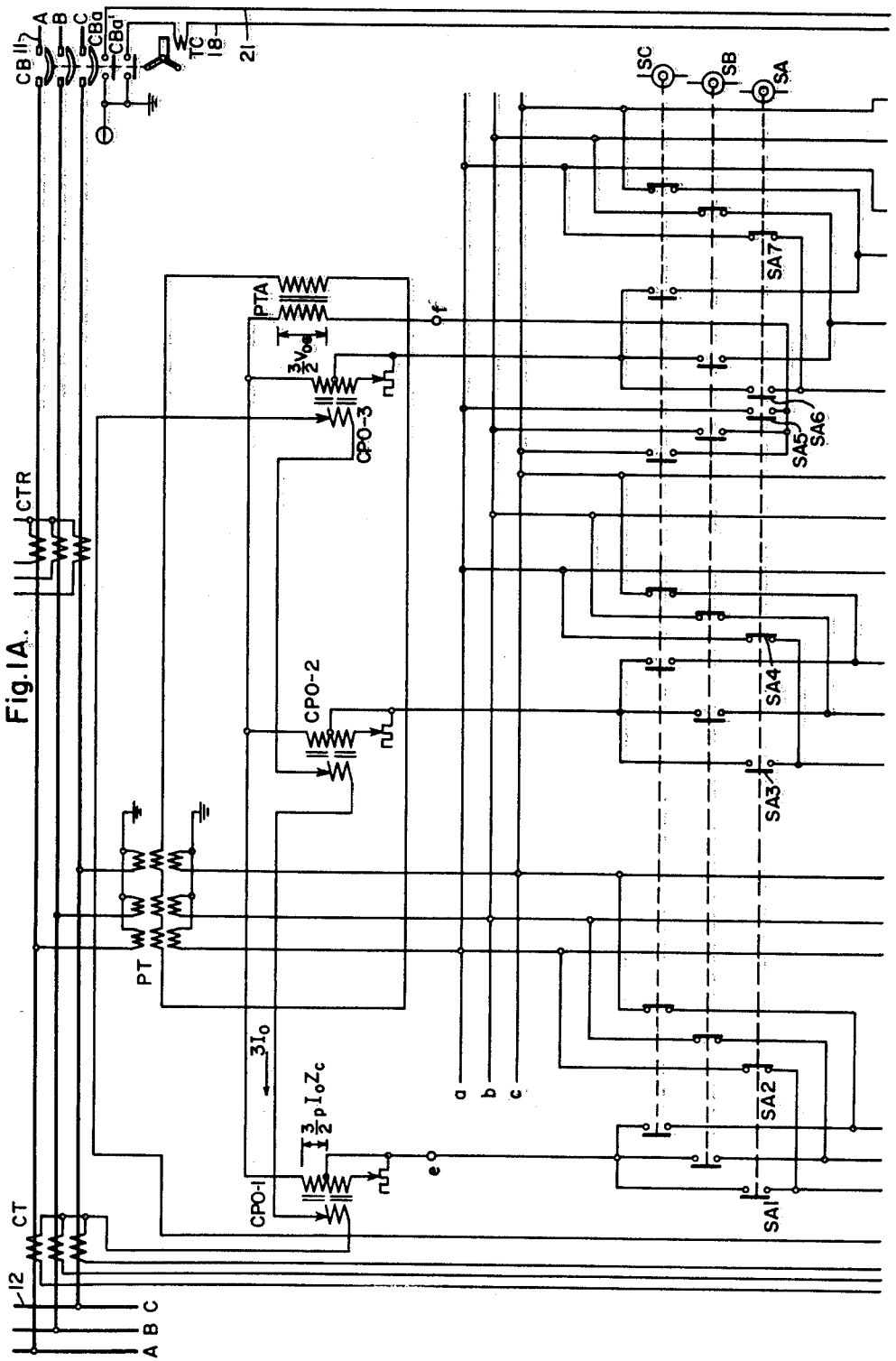
Figure 1B:
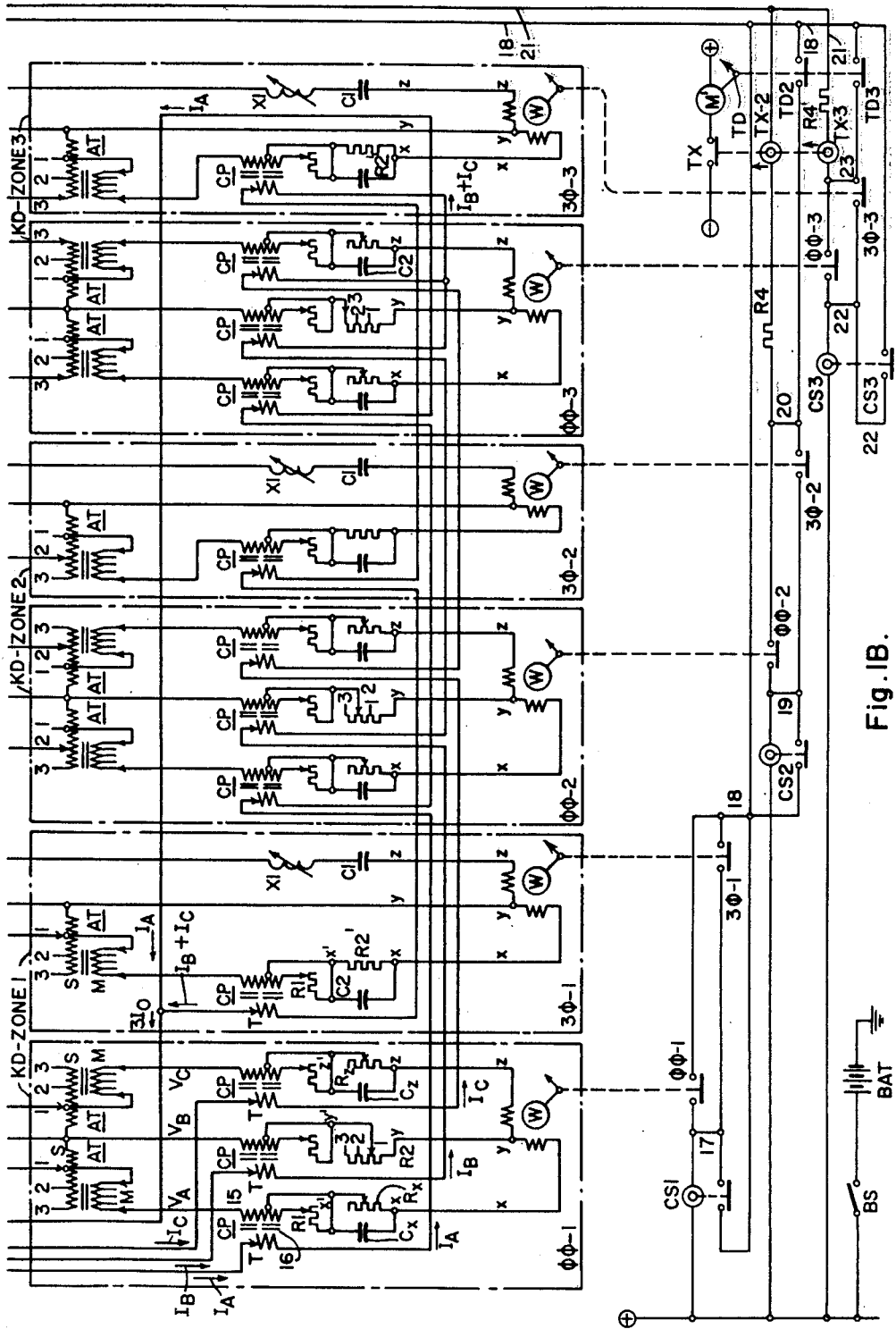

FIGS. 1A and 1B incorporate an invention disclosed and claimed in my copending patent application, Serial No. 685,155, filed September 20, 1957, which has issued as Patent 2,973,459. As long as three relays SA, SB, SC are in the position illustrated, the embodiment of FIGS. 1A and 1B operates in the same manner as that shown in FIG. 1 of my copending patent application. For the present, relays SA, SB and SC will not be considered.

In FIGS. 1A and 1B I show a compensator relaying system, applied for the protection of a three-phase line-section 11, which is connected to a three-phase bus 12, at the relaying station, through a circuit breaker CB. A set of line-current transformers CT derive the line-currents $I_A$, $I_B$, $I_C$ and the star-point current $3I_0$ for relaying purposes, where $I_0$ is the zero-sequence component of the line-currents. A set of potential transformers PT is used for deriving the line or bus-voltage $a$, $b$ and $c$ for relaying purposes.

In FIGS. 1A and 1B, I show six relaying-units which I call Type KD units, two for each of the three zones of protection, namely, a phase-fault unit $\phi\phi$ for responding to all kinds of double-line faults, and a three phase unit $3\phi$ for responding to three-phase faults, for each zone, the zones being indicated by appended numbers, such as the designation $\phi\phi$-1 for the first-zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and those in FIG. 1B are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown in FIG. 1, a convenient means for aiding in adjusting the effective impedance-value of each compensator, by adjusting the value of the derived bus-voltage which is applied to the relaying circuits. To this end, I show a plurality of auto-transformers AT, each having three adjustable primary-connection taps numbered 1, 2 and 3 on each main autotransformer-winding S. The secondary or output circuit of each autotransformer in FIG. 1 is permanently connected to the tap S1, and this secondary circuit serially includes some fine-adjustment taps on a tertiary winding M of the autotransformer which can add or subtract small fractional increments to the secondary voltage, according to the polarity of the connections to the M-taps. The output-circuit of the tertiary autotransformer-winding M produces the effective bus-voltage which is used in that phase of the relaying circuit.

In FIG. 1B, each of the compensators CP is provided with a tapped primary winding T, having a small number of turns, and a secondary winding 15, having a large number of turns, these two windings being magnetically interlinked through an air-gapped core 16 so that the compensator-voltage which is generated in the secondary winding 15 will be substantially 90° or less, out of phase with the current which traverses the primary winding T, depending upon the amount of effective resistance R1. The provision of the air gap is desirable for the reason that the air-gap compensator provides an effective transient shunt which tends to remove any direct-current transient from the energy supplied to the relays. The relays herein described are remarkably free of direct-current transient response.

The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{TS}{(1 \pm M)}$$

where T, S and M are the numbers or fractional numbers which are marked on the chosen taps of the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

It will be subsequently explained that, for the best results, the impedance-angle of the compensator-impedance should match the impedance-angle of the particular transmission line 11 which is being protected. In accordance with an invention which is described and claimed in an application of Howard J. Calhoun, Serial No. 685,167, filed September 20, 1957, which has issued as Patent 2,973,460, FIG. 1 shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from $R1=0$, to provide a minimum impedance-angle, to $R1=600$ ohms, to provide a maximum impedance-angle of approximately 85°, (for example); or the resistance R1 may be infinity, or an open circuit to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance angles. This provides the best means which has heretofore been devised for accomplishing this purpose.

Referring, now, to the phase-fault units $\phi\phi-1$, $\phi\phi-2$ and $\phi\phi-3$ of the three zones, 1, 2, and 3, of the non-carrier Type KD relaying system shown in FIG. 1B, each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase $ba$ of the potential-transformer bus $abc$, while the other autotransformer has its primary connection across the delta phase $bc$. The three phase-fault relay-units $\phi\phi-1$, $\phi\phi-2$ and $\phi\phi-3$, are designed to respond to line-to-line faults and to double-line-to-ground faults. Said units are all alike, except for their different distance-settings, or the different impedance-settings of their compensators CP, as indicated by the choice of the S-taps 1, 2 and 3, respectively, for the first, second and third zones, as shown in FIG. 1B.

The output-circuits of the two autotransformers AT of each phase-fault relay-unit, such as the unit $\phi\phi-1$ thus provide an adjustable three-phase derived bus-voltage $V_A$, $V_B$, $V_C$. The primary windings T of the three compensators CP of each of these phase-fault units, such as $\phi\phi-1$, are energized from the respective derived line-currents $I_A$, $I_B$ and $I_C$ which are supplied by the line-current transformers CT. The three compensators CP subtract their respective compensator-voltages from the corresponding phases of the derived bus-voltages $V_A$, $V_B$ and $V_C$, producing a three-phase compensated voltage at the points $x'$, $y'$ and $z'$ as shown for the relay-unit $\phi\phi-1$ in FIG. 1B.

The compensated voltages $x'$, $y'$ and $z'$ of each phase-fault relaying-unit, such as $\phi\phi-1$ in FIG. 1, are used to energize a suitable type of relay, such as a torque-producing relay element which produces no torque at all (that is, it has a balance-point), when the positive and negative-sequence components of the impressed three-phase voltages $x'$, $y'$ and $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the watt-meter type of single-phase relay-element W in each of the six relaying units $\phi\phi-1$, $3\phi-1$, $\phi\phi-2$, $3\phi-2$, $\phi\phi-3$ and $3\phi-3$ as diagrammatically indicated in FIG. 1B. There are various ways in which the two circuits for each of these torque-producing elements may be energized, from any two differing voltages which may be derived from different phases of the three-phase compensated voltages, such as $x'$, $y'$, $z'$ of FIG. 1B.

In the particular circuit-connections which are shown for $\phi\phi-1$ relay-unit in FIG. 1B, the two-circuit torque-producing element W has one winding-circuit $xy$ energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the $\phi\phi-1$ unit in FIG. 1B, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as $\phi\phi-1$ of FIG. 1B, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points $y'$ and $y$, and providing this resistance R2 with three taps, also numbered 1, 2 and 3, which are changed simultaneously with the S-taps of the autotransformers. Dissimilar transient effects, due to sudden bus-voltage changes in the three circuits $ay$, $by$ and $cy$ are compensated for by serially including capacitors $C_x$ and $C_z$ between the points $x'$ and $x$ and between the points $z'$ and $z$, respectively to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions $(C_x R_x)$, R2 and $(C_z R_z)$ balance the phase-angles of the impedances of the three circuits $ay$, $by$ and $cy$, with open primaries on the three compensators CP. Thus, when a close-in phase-to-phase fault occurs, behind the current transformers CT, one of the delta-bus-voltages $V_{AB}$, $B_{BC}$ or $V_{CA}$ is collapsed to zero. If we assume the extreme system-condition of no back-feed current over the line which is being protected, the compensators do nothing to alter this collapsed voltage. Under this condition, there should be no spurious torque in the relay to cause it to respond incorrectly. These transient-suppressing elements prevent such spurious response as might otherwise be occasioned by the sudden change in the bus-voltages in the extreme case in which there may be no current in the primaries of the compensators.

FIG. 1B also shows three-phase-fault-responsive relays $3\phi-1$, $3\phi-2$ and $3\phi-3$, one for each of the three zones. These particular relays embody the basic concept of an invention of S. L. Goldsborough, as described and claimed in his application Serial No. 685,168, filed September 20, 1957, which has issued as Patent 2,973,461. These three three-phase relays are all alike, except for their distance-settings which are changed in much the same manner as has been described for the phase-fault relays $\phi\phi-1$, $\phi\phi-2$, $\phi\phi-3$, so that a description of one, say the three-phase element $3\phi-1$, will suffice for all.

A principal characteristic feature of this three-phase fault-responsive relay $3\phi-1$, as distinguished from the phase-to-phase fault-responsive relay $\phi\phi-1$, is that the three-phase relay $3\phi-1$, uses only a single compensator CP, which has 1.5 times the effective mutual impedance of each of the three compensators CP which are used in the phase-fault relay $\phi\phi-1$. The phase in which this single compensator CP is connected, in the relay-unit $3\phi-1$ of FIG. 1B, is designed as phase A. This three-phase unit $3\phi-1$ uses a single autotransformer AT, which is similar to the autotransformers which have been described for the phase-fault relay $\phi\phi-1$. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit $3\phi-1$, the other two bus-voltage phases being the phases $b$ and $c$, unchanged.

In the three-phase unit $3\phi-1$, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase-fault relay $\phi\phi-1$, remembering that the compensator CP in the three-phase relay $3\phi-1$ has an impedance-setting which is 1.5 times as high as in the phase-fault relay $\phi\phi-1$.

In the case of the three-phase relay $3\phi-1$ which is shown in FIG. 1B, the compensator-primary T is traversed by the current $-(I_B+I_C)$, which is equal to $(I_A-3I_0)$, where $I_0$ is the zero-sequence component of the line-current, as derived by the current-transformer CT, as described and claimed in an application of J. G. Chevalier, Serial No. 685,277, filed September 20, 1957, which has issued as Patent 2,973,462.

The cylinder-unit W, which is used in the three-phase relay-element $3\phi-1$ in FIG. 1B, is basically a two-phase induction motor which produces torque in a direction which is determined by the phase-angle between the two voltages, and in a magnitude which is responsive to the product of the two voltages which are impressed upon the torque-producing element multiplied by the sine of the phase-angle between the two voltages. When a three-phase fault occurs close to the bus 12 at the relaying terminal of the protected line 11, all of the delta voltages of the bus will collapse to zero. And since the three-phase element $3\phi-1$ uses only one compensator CP, there will be a voltage $x'$ in only one phase of the three-phase voltages which are supplied to the torque-producing cylinder-unit W, this phase being the phase which contains the compensator CP. This provides energization for the phase-winding $xy$ of the torque-element W. However, the energization for the other phase-winding $zy$ of the torque-element collapses to zero, in response to a three-phase line-fault near the bus, which means that the torque-element, if it responded at all under such conditions, would have only a momentary transient response, as a result of its memory-action as the uncompensated $zy$ voltage is collapsing to zero.

In order that the three-phase fault-responsive unit $3\phi-1$ may react, with accuracy or intelligence, to a three-phase line-fault close to the relaying station 12, it is desirable not only to sustain a sufficient magnitude of the uncompensated bus-voltage $zy$ which is applied to the torque-producing element, so that there can be a sufficient torque to operate the relay, but also to sustain or maintain the proper phase-angle between the two relay-voltages $xy$ and $zy$ long enough for the relay to react at all, and to know in which direction to react, because the relay-torque is determined by the product of the magnitudes of the impressed voltages, multiplied by the sine of the phase-angle between these two voltages.

As described and claimed in the previously mentioned Calhoun application, the uncompensated $zy$ voltage on the torque-element W of the three-phase unit $3\phi-1$ is sustained, for a sufficiently long time, by a memory-circuit comprising a serially connected capacitor C1 and an adjustable choke-coil X1, connected in series between the bus-terminal $c$ and the terminal $z$ of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit $3\phi-1$ of FIG. 1B, necessarily introduces a transient disturbance, which is suppressed or compensated for, in accordance with the Calhoun invention, by connecting a second capacitor C2 between the points $x'$ and $x$, in the compensated-voltage phase $x$ of said torque-element $3\phi-1$ of FIG. 1B, this second capacitor C2 being shunted by a resistor R2' which not only enhances the effect of the capacitor C2, but also enables said capacitor to suppress transients with as little memory-action as possible.

The relaying equipment which is shown in FIG. 1B requires a timer, such as TD, which is available whenever there is a fault. While I am not limited as to exact details, I can use a single-phase timer TD, which receives an energizing current whenever a fault-current is flowing.

The timer-motor TD is connected in series with the normally open make contact TX of an auxiliary timer-relay TX. In my aforesaid copending patent application the operating motor of the timer is energized from a source of alternating current which is available under all fault conditions. In the present case the timer preferably is equipped with a direct-current energized motor M' which is energized from a direct-current source represented by polarity marks (+) and (−) through make contacts of the timer-relay TX.

The six fault-responsive elements of FIG. 1B have correspondingly numbered make-contacts φφ–1, 3φ–1, φφ–2, 3φ–2, φφ–3 and 3φ–3, which are used to control certain relaying-circuits which are shown as being energized from a positive direct-current bus (+).

The first circuit which is connected to the positive bus (+) in FIG. 1B is a first-zone tripping-circuit which includes the operating-coil of a contactor-switch CS1, then a circuit 17, then the make contacts φφ–1 of the first-zone phase-fault unit φφ–1, then a tripping-circuit 18, which extends up through the trip-coil TC of the circuit breaker CB, and finally through an auxiliary circuit-breaker make-contact CBa' to a negative bus (−), the circuit-breaker make-contact CBa' being closed when the circuit breaker CB is closed, the circuits being illustrated, however, with all switches and relays open or deenergized. Two branch-circuits are also provided between the points 17 and 18 of the first-zone protective-relaying equipment, these two branch circuits including, respectively, the make-contact 3φ–1 of the first-zone three-phase unit 3φ–1, and the make-contact CS1 of the contactor switch CS1.

A second-zone relaying-circuit is next shown in FIGS. 1A and 1B extending from the positive bus (+) through the energizing-coil CS2 of a second contactor-switch CS2, then to a circuit 19, then through the make-contact φφ–2 of the second-zone phase-fault unit φφ–2 to a circuit 20, then through a resistor R4 and through an operating-coil TX–2 of the auxiliary timer-relay TX to a circuit 21, which extends up through an auxiliary make contact CBa of the circuit breaker CB, and thence to the negative bus (−). The two circuits 19 and 20 are joined also by a branch-circuit which includes the make-contact 3φ–2 of the second-zone three-phase unit 3φ–2. Consequently, the circuit 20 is energized as a result of the response of either one of the two second-zone units φφ–2 or 3φ–2. This circuit 20 thus energizes the auxiliary timer-relay TX, which initiates the movement of the timer TD, whenever there is a line fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil TX–2, either because of its built-in resistance, or because of an externally connected resistance R4, does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected, in FIG. 1B, from the positive bus (+) through the operating-coil of a third contactor-switch CS3, then to a circuit 22, then to two branch circuits, one extending from the circuit 22 through the make contact φφ–3 of the third zone phase-fault unit φφ–3 to a circuit 23, the second branch-circuit extending from the circuit 22 through a make-contact 3φ–3 of the third-zone three-phase unit 3φ–3, to said circuit 23. From the circuit 23, a first branch-circuit continues through a second operating-coil TX–3 of the auxiliary timer-relay TX, the resistor R4', and thence to the circuit 21, so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of FIG. 1, the positive bus (+) is shown as being energized, through a battery-switch BS, from the positive terminal of a battery BAT, the negative terminal of which is grounded, to connect with the grounded negative bus (−).

Although the portion of the relaying system of FIGS. 1A and 1B thus far specifically described provides excellent protection against phase-to-phase and three-phase faults, special equipment has been provided heretofore to protect the associated transmission line against single-phase-to-ground faults.

It will be recalled that the relaying element is intended to respond to the relation between the positive-sequence and the negative-sequence components. These components should be equal to each other for a fault at the balance-point of the protected line section. However, for a single-phase-to-ground fault occurring at the balance point the relay "sees" a positive-sequence component which exceeds the negative-sequence component by the amount of the zero-sequence component of voltage.

In accordance with the invention the components "seen" by the relay are modified to provide resultant quantities which appear to the relay to be equal and opposed for a single-phase-to-ground fault at the balance point. In a preferred embodiment of the invention, half of the zero-sequence component is added to the positive-sequence component to provide a positive-sequence-based resultant quantity and half is added to the negative-sequence component to provide a negative-sequence-based resultant quantity which is equal in magnitude to the positive-sequence-based resultant quantity. The relaying element responds to these resultant quantities in the same manner as to the previously discussed positive and negative-sequence components. Inasmuch as these resultant quantities are equal in magnitude for faults at the balance-point the relaying element correctly protects the desired line section for single-phase-to-ground faults.

A desirable arrangement for introducing the zero-sequence component is shown in FIG. 1A. The selection of the proper phase for introduction of the zero-sequence component is effected by three phase-selector relays SA, SB, SC (these relays are assumed to be biased to the left as viewed in FIG. 1A). When a single-phase-to-ground fault involves phase A, the relay SA picks up (i.e., moves to the right in FIG. 1A). In an analogous manner relays SB and SC picks up for single-phase-to-ground faults respectively involving phases B and C. Relays responding in this manner are well known in the art, and are shown, for example, in the Goldsborough Patent 2,445,429. Relays responding in this manner also have been commercially marketed by the Westinghouse Electric Corporation of East Pittsburgh, Pennsylvania under the trade designation HPS.

Let it be assumed that a single-phase-to-ground fault occurs at the balance point of the protected line section. In the embodiment of FIG. 1A a quantity equal to one-and-one-half times the zero-sequence component of voltage at the fault (or $3/2\ V_{OF}$) additionally is inserted in series with that phase input to the phase-fault relay-units φφ–1, φφ–2 and φφ–3 which correspond to the faulted phase.

The inserted voltage is derived in part from a transformer PTA which has a primary winding connected for energization from delta-connected tertiary windings provided in the potential transformer PT. The delta-connected tertiary windings and the transformer PTA are proportioned to deliver from the transformer PTA a secondary voltage $3/2\ V_{OG}$ wherein $V_{OG}$ represents the zero-sequence component of voltage at the relaying station. To obtain the corresponding zero-sequence component of voltage $V_{OF}$ at the fault, a quantity proportional to the quantity $I_0 Z_C$ is subtracted from $3/2\ V_{OG}$ to provide $$3/2\ V_{OF} = 3/2\ V_{OG} - 3/2\ p\ I_0 Z_C$$

In this expression $I_0$ represents the zero sequence component of line current, $Z_C$ represents the line-impedance to the balance-point of the relay, and $p$ represents the ratio of the zero-sequence-component to the positive-sequence-component of line impedance.

For the first-zone phase-fault unit, a compensator CPO–1 is provided. Similar compensators CPO–2 and CPO–3 are provided respectively for the second-zone and third-zone phase-fault units. These compensators may be similar in construction to the previously described compensators CP.

Let it be assumed that a single-phase-to-ground fault occurs which involves phase A. As a result of this fault the phase-selector relay SA picks up (i.e. moves to the right in FIG. 1A) to open its break contacts SA2, SA4, and SA7. The opening of these contacts disconnects the phase A voltage terminal of each of the phase-fault units $\phi\phi$–1, $\phi\phi$–2 and $\phi\phi$–3 from the voltage bus $a$. In addition, the relay SA closes its make contacts SA5 to connect the lower terminal of the secondary winding of the transformer PTA to the voltage bus $a$. The relay SA also closes its make contacts SA1, SA3 and SA6 to connect the phase A voltage terminals of the phase-fault units $\phi\phi$–1, $\phi\phi$–2 and $\phi\phi$–3 respectively through the output windings of the compensators CPO–1, CPO–2 and CPO–3 to the upper terminal of the secondary winding of the transformer PTA.

The relay SA is designed to close its make contacts slightly before it opens its break contacts. During the brief time that both sets of contacts are closed current from the transformer PTA is limited by the impedances of the associated compensator secondary windings.

As a result of the operation of the phase-selector relay SA, the energizations of the phase-fault units $\phi\phi$–1, $\phi\phi$–2 and $\phi\phi$–3 are modified by introducing the factor $3/2\ V_{OF}$ (wherein $V_{OF}$ represents the zero-sequence-component of voltage at the fault) in series with the voltage energizations supplied to the phase A terminal of the phase-fault units. The compensated-zero-sequence voltage $3/2\ V_{OF}$ appears across the terminals $e$ and $f$. As previously pointed out, the units now correctly respond to the single-phase-to-ground fault. In an analogous manner a single-phase-to-ground fault involving phase B or phase C of the line results in operation of the phase-selector relay SB or SC to modify the energizations of the phase B or phase C terminals of the phase-fault units $\phi\phi$–1, $\phi\phi$–2 or $\phi\phi$–3.

For a two-phase-to-ground fault occurring at the balance point the positive-sequence and negative-sequence components of voltage at the fault are equal. For such a fault the phase-selector relay SA, SB or SC associated with the unfaulted phase picks up. In effect the system shown in FIGS. 1A and 1B adds to each of these positive-sequence and negative sequence components, a zero-sequence-component of voltage. The phase-fault units still operate correctly. As a matter of fact the increase in the energization supplied to the phase-fault units contributes to even more precise operation of the units for two-phase-to-ground faults.

In the foregoing discussion of FIGS. 1A and 1B it was assumed that the phase-selector relays SA, SB and SC were similar to similarly designated relays in the Goldsborough Patent 2,445,429. As previously pointed out these relays not only select the faulty phase for a single-phase-to-ground fault but they select the unfaulted phase for a two-phase-to-ground fault.

FIG. 2 shows phase-selector relays which may be employed in the system of FIGS. 1A and 1B. The system of FIG. 2 is of simple construction and does not respond to two-phase-to-ground faults.

In effect the system of FIG. 2 compares the magnitude of an operating current for each phase with the maximum of restraining currents corresponding to currents in the two remaining phases of the line. For a single-phase-to-ground fault the operating current for the faulty phase will exceed the restraining currents and will operate a relay for the faulty phase. For a two-phase-to-ground fault each phase current will be compared with a restraining current which is sufficient to prevent a response to the fault condition.

Referring to FIG. 2, direct voltages $E_A$, $E_B$ and $E_C$ are applied across resistors $R_A$, $R_B$ and $R_C$ which correspond in magnitude to the alternating phase currents. Energy for the system of FIG. 2 is derived from line-current transformers CTR which are also shown in FIG. 1A. The line-current transformers CTR supply alternating currents $i_A$, $i_B$ and $i_C$ respectively to the primary windings of three transformers $TR_A$, $TR_B$ and $TR_C$. The subscripts A, B, C or $a$, $b$, $c$ denote the phases A, B and C respectively to which the associated reference characters relate.

Considering first the components associated with the phase A, the secondary winding of the transformer $TR_A$ is connected to the resistor $R_A$ through a rectifier unit. In the embodiment of FIG. 2 a full-wave rectifier is shown wherein the two terminals of the secondary winding of the transformer $TR_A$ are connected respectively to the upper terminal of the resistor $R_A$ through two half-wave rectifiers $D_A$ and wherein a center tap on the secondary winding is connected to the lower terminal of the resistor $R_A$. A capacitor $C_A$ is connected across the resistor $R_A$ to assist in filtering out any ripples present in the direct voltage. Load resistor $R_{LA}$ is connected across the secondary winding of the transformer $TR_A$ to control the current to voltage relation.

In an analogous manner voltages $E_B$ and $E_C$ are developed across the resistors $R_B$ and $R_C$ which correspond respectively to the phase B and phase C line currents.

The direct voltage $E_A$ across the resistor $R_A$ is applied across a resistor $R_{CA}$ through a rectifier $D_1$ and across a resistor $R_{AB}$ through a rectifier $D_2$. The direct voltage $E_B$ across the resistor $R_B$ is applied across the resistor $R_{AB}$ through a rectifier $D_3$, and across a resistor $R_{BC}$ through a rectifier $D_4$. The direct voltage $E_C$ appearing across the resistor $R_C$ is applied across the resistor $R_{BC}$ through a rectifier $D_5$ and across the resistor $R_{CA}$ through a rectifier $D_6$.

Because of these "maximum-voltage" connections, a maximum voltage $E_{CA}$ appears across the resistor $R_{CA}$ which is the larger of the voltages $E_A$ and $E_C$. A maximum voltage $E_{AB}$ appears across the resistor $R_{AB}$ which is the larger of the voltages $E_A$ and $E_B$. A maximum voltage $E_{BC}$ appears across the resistor $R_{BC}$ which is the larger of the voltage $E_B$ and $E_C$.

Each of these maximum voltages derived from two of the three source voltages $E_A$, $E_B$ and $E_C$ is compared with the remaining one of the three source voltages. Although the source voltages could be employed directly for these comparisons preferably a predetermined fraction is employed. To this end each of the resistors $R_A$, $R_B$ and $R_C$ is provided with a tap to produce voltages $E_{XA}$, $E_{XB}$ and $E_{XC}$ which are fractions of the respective source voltages $E_A$, $E_B$ and $E_C$.

By inspection of FIG. 2 it will be noted that the relay SA is connected through a rectifier $D_7$ across the voltages $E_{XA}$ and $E_{BC}$ in series opposition. The rectifier $D_7$ permits energization of the relay SA only if the voltage $E_{XA}$ exceeds the voltage $E_{BC}$. Inasmuch as the voltage $E_{XA}$ is a fractional percentage of the voltage $E_A$, the voltage $E_A$ must exceed the voltage $E_{BC}$ by a substantial amount to operate the relay SA. The voltage $E_A$ will so exceed the voltage $E_{BC}$ for a single-phase-to-ground fault affecting the associated phase A, and the relay SA thus provides what is termed a "percentage-type" characteristic.

In an analogous manner, the relay SB is connected through a rectifier $D_8$ for energization in accordance with the voltage difference $E_{XB}-E_{CA}$ and the relay SC is connected through a rectifier $D_9$ for energization in accordance with the voltage difference $E_{XC}-E_{AB}$.

The transformers $TR_A$, $TR_B$ and $TR_C$ may be of conventional construction. If a more linear relation over an extended range is desired the transformer cover may be provided with air gaps. If such air gaps are provided, the resistors $R_{LA}$, $R_{LB}$ and $R_{LC}$ may be omitted if so desired.

For applications in which it is desired to limit transformer outputs for large primary currents the transformer cores may be designed to saturate for such large primary currents.

If protection of the relays against excessive energization is desired, a Zener diode may be connected in the blocking direction in parallel with each of the relays. For example, a Zener diode $Z_A$ is connected in parallel with the relay SA. If the voltage across the relay exceeds a predetermined value for which the Zener diode is set, the diode breaks down to protect the relay. Similar diodes $Z_B$ and $Z_C$ are shown for the other relays SB and SC.

The arrangement of FIG. 2 is particularly suited for the protection of conventional, solidly-grounded systems wherein the power-factor angles of the zero-sequence-component and negative-sequence-component networks are substantially the same.

In some systems an appreciable difference may exist between currents in the two grounded phases involved in a two-phase-to-ground fault. For example, such a difference may be present on the occasional system grounded through a resistor or in which the power-factor angles differ substantially for the zero-sequence-component and negative-sequence-component networks.

To minimize the effect on the relay arrangement of any imbalance between the two currents in the grounded phases of a system having a two-phase-to-ground fault, the zero-sequence-component of current may be deleted from the energization of the relay arrangement. This decreases the operating current supplied to the relay arrangement for a single-phase-to-ground fault, but the difference between such operating current and the restraining current is adequate for proper relay operation.

A suitable arrangement for deleting the zero-sequence-component of current from the energization of the relay arrangement of FIG. 2 is shown in FIG. 3. The arrangement of FIG. 3 is identical to the arrangement of FIG. 2 except for the energization of the primary windings of the transformers $TR_A$, $TR_B$ and $TR_C$. Similar portions of the arrangements of FIGS. 2 and 3 are shown in a box RS. In FIG. 3 the primary windings are connected in Y for energizations from the transformers CTR but do not have a neutral return for the zero-sequence-component to the transformer CTR. A path for the zero-sequence-component is provided by an auxiliary transformer DTR having secondary windings connected in a closed circuit and Y-connected primary windings. The Y-connected secondary windings of the transformers CTR and the Y-connected primary windings of the transformers DTR have corresponding terminals (including neutral terminals) connected to each other to provide a path for the zero-sequence-component of current as is well known in the art.

In the arrangement of FIG. 3 the zero-sequence-component of current is not supplied to the transformers $TR_A$, $TR_B$ and $TR_C$. Consequently, the relay arrangement of FIG. 3 is universally applicable to all three-phase systems to be protected.

By modifying the energization of the compensators CP of the phase-fault units $\phi\phi-1$, $\phi\phi-2$ and $\phi\phi-3$ the additional compensators CPO–1, CPO–2 and CPO–3 of FIG. 1A can be eliminated. Such elimination is shown in the system of FIGS. 4A and 4B.

Figure 4A:
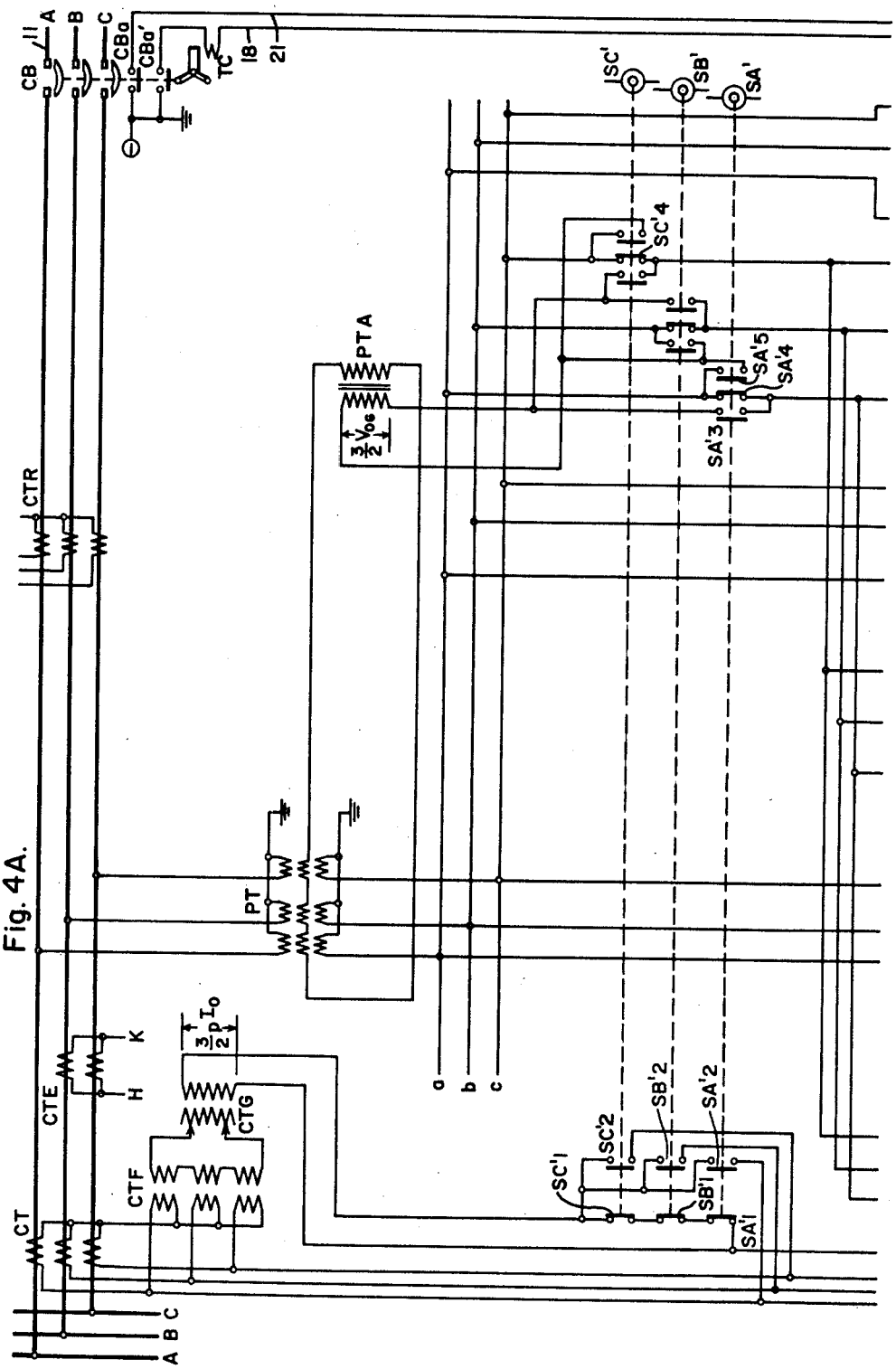
FIGS. 4A and 4B represent together a diagrammatic view of a modified form of the invention.
Figure 4B:
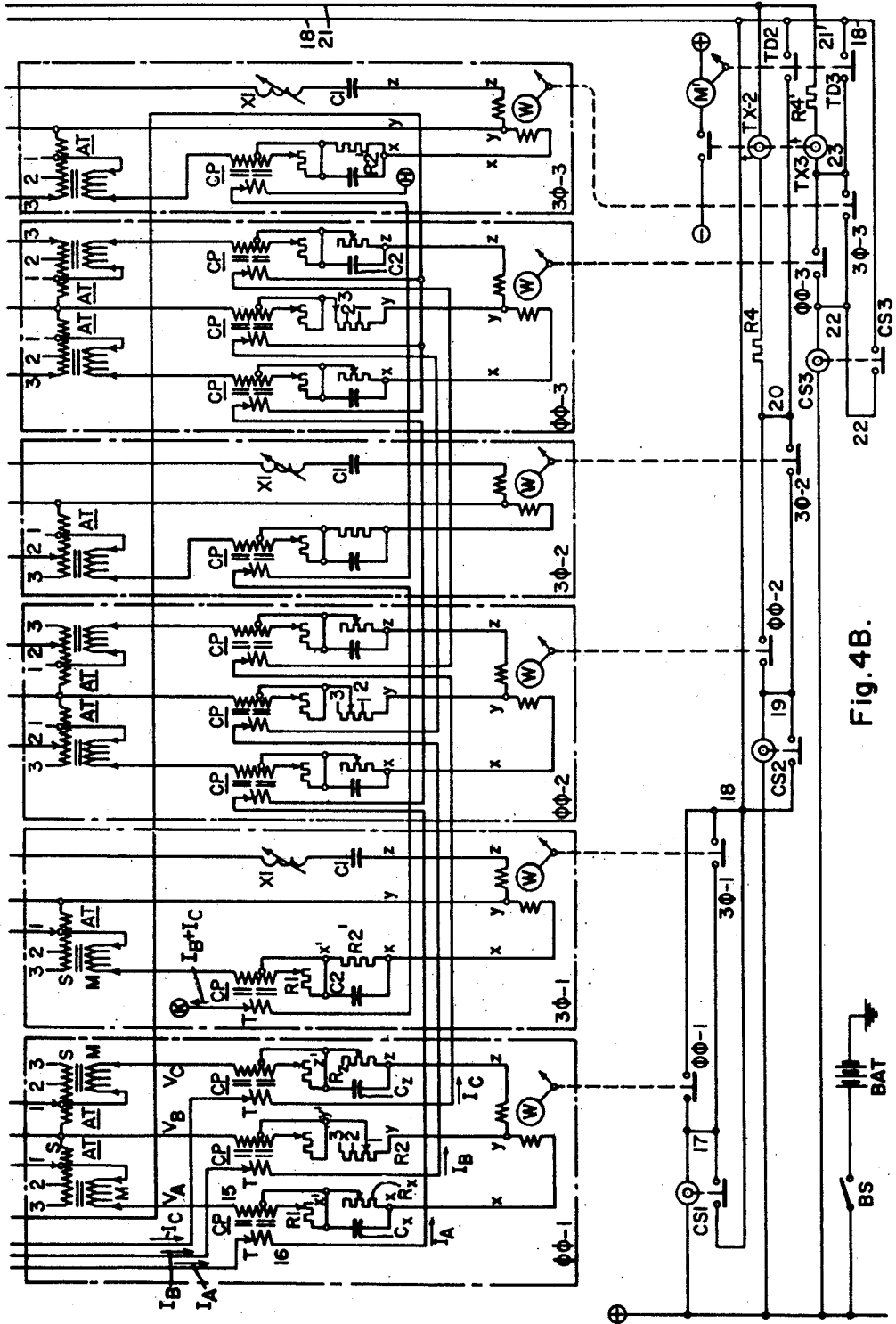

FIGS. 1A and 4A have a number of similar components which bear similar reference characters. FIG. 4B is similar to FIG. 1B except for the circuits for current energization of the primaries of the compensators CP. In FIG. 4B the primaries of the compensators for the three-phase relays $3\phi-1$, $3\phi-2$ and $3\phi-3$ are connected in series for energization from two terminals H and K. These are terminals of line-current transformers CTE associated with the phases B and C of the line to energize the primaries in accordance with the sum of the phase currents $I_B+I_C$. Consequently, the effective energizations of the primaries of the compensators for the three-phase relays is similar to those for the same primaries in FIG. 1B.

The primaries of all phase A compensators of the phase fault units $\phi\phi-1$, $\phi\phi-2$ and $\phi\phi-3$ are connected in series. Similarly the primaries of all phase B compensators of these units are connected in series and the primaries of all phase C compensators of these units are connected in series. The three series groups of primaries are connected in Y to the secondaries of the current transformers CT of FIG. 4A.

When a single-phase-to-ground fault occurs, one of the phase-selector relays SA′, SB′ or SCS′ picks up. These relays are similar to the relays SA, SB and SC of FIG. 1A except for contact arrangements. When one of the phase-selector relays picks up a zero-sequence-component of current is injected into the primaries of the appropriate compensators of the phase-fault units.

Transformers CTF and CTG provide a source of zero-sequence-component of current. The transformers CTF have primaries connected in Y for energization from the transformers CT. The neutrals of these transformers are connected to establish a path for the zero-sequence-component. The secondary windings of the transformer CTF are connected in series across the adjustable primary of a single-phase transformer CTG. These transformers are designed to provide a current $3/2\ p\ I_0$ in the secondary of the transformer CTG.

Normally, the secondary of the transformer CTG is shunted by three back or break contacts SA′1, SB′1 and SC′1 of the phase-selector relays. When a single-phase-to-ground fault occurs one of the phase-selector relays picks up to interrupt the shunt circuit. When picking up, the relay also closes front or make contacts to connect the secondary of the transformer CTG across the series group of primaries of the compensators associated with the faulted phase.

For example, let it be assumed that a single-phase-to-ground fault involving the phase A of the line results in pick up of the phase-selector relay SA′. This relay opens its break contacts SA′1 to interrupt the shunt across the secondary of the transformer CTG. Also, the make contacts SA′2 close to connect the primaries of the compensators associated with phase A of the phase-fault units $\phi\phi-1$, $\phi\phi-2$ and $\phi\phi-3$ in series across the secondary of the transformer CTG. These primaries now are energized not only in accordance with the positive and negative-sequence components of the phase A line current but also in accordance with the quantity $3/2\ p\ I_0$ derived from the transformer CTG. In a similar manner a single-phase-to-ground fault involving phase B or phase C injects the quantity $3/2\ p\ I_0$ into the primaries of the compensators associated with the phase B or phase C of the phase-fault units.

The make contacts of the phase-selector relays closes slightly before the break contacts of these relays open.

The phase A primary terminals of the autotransformers AT associated with the phase-fault units $\phi\phi-1$, $\phi\phi-2$ and $\phi\phi-3$ are all connected to the voltage bus $a$ through back or break contacts SA′4 of the phase-selector relay SA′. Similarly the phase B primary terminals of the same autotransformers are connected to the voltage bus $b$ through the back or break contacts SB′4 and the corresponding phase C primary terminals are connected to the voltage bus $c$ through the back or break contacts SC′4.

When the phase-selector relay SA′ picks up it closes front or make contacts SA′3 and SA′5 to connect the secondary of the transformer PTA in series with the voltage from the voltage bus *a* which is applied to the phase-fault units. In a similar manner pick up of the phase-selector relay SB' or SC' connects the secondary of the transformer PTA in series with the voltage from the voltage bus *b* or *c* which is applied to the phase-fault units.

From the foregoing discussion it follows that as long as the phase-selector relays are dropped out of the system of FIGS. 4A and 4B operates in the same manner as that shown in FIG. 1 of my aforesaid patent application. However, when a single-phase-to-ground fault occurs on the system, the energization of that phase of the phase-fault units φφ–1, φφ–2 and φφ–3 which corresponds to the faulted phase is modified by injection of a current corresponding to the expression 3/2 p $I_0$ and a voltage corresponding to the expression 3/2 $V_{OG}$. This modification in energization results in correct response of the phase-fault units to the single-phase-to-ground fault.

In the preferred embodiments thus far discussed in detail single-phase-to-ground fault protection has been incorporated in an arrangement providing complete distance protection for an alternating system. If desired the single-phase-to-ground fault protection may be added to systems as a separate protective arrangement by omitting components such as the three-phase relaying means 3φ–1, 3φ–2 and 3φ–3 which are not required in ground protection.

Figure 5:
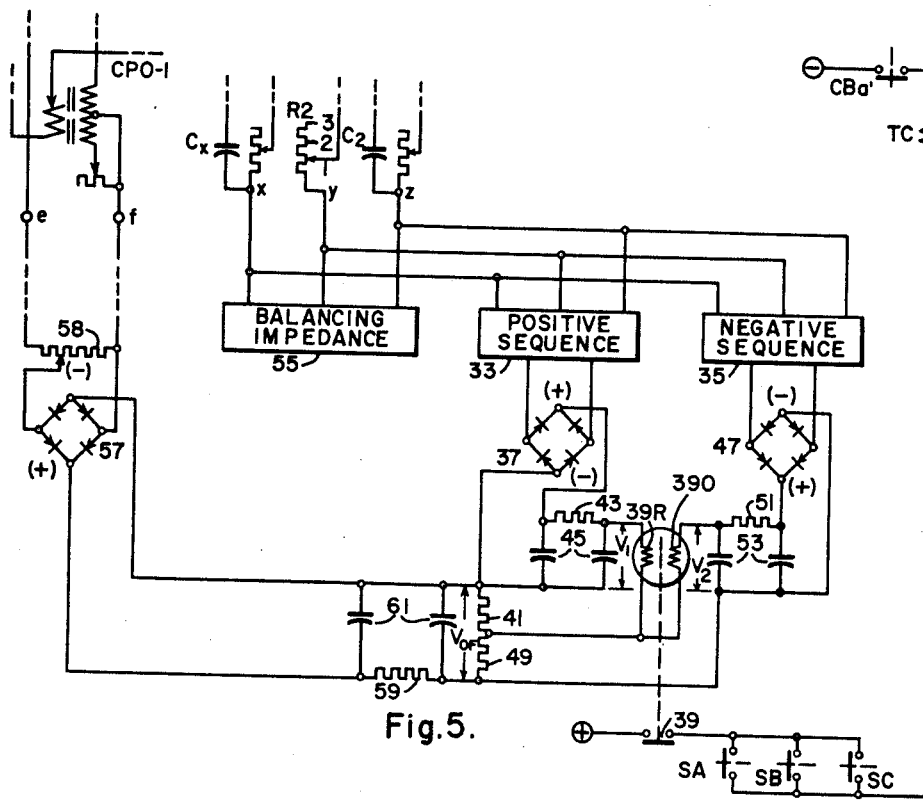
FIG. 5 is a diagrammatic view illustrating a modified form of the invention; and, FIG. 6 is a diagrammatic view of a modified form of the embodiment of FIG. 2.

In the embodiments thus far specifically described an induction-type relay-element W is discussed. However, as previously explained the relay-element W may be replaced by other electroresponsive static or motive elements. In FIG. 5 a modification is illustrated which employs a differential relay element.

To simplify the presentation of this modification, it is assumed to be based on the embodiment of FIGS. 1A and 1B with the contacts of the relays SA, SB and SC permanently in the positions shown in FIGURE 1A. For further simplification the discussion will be restricted to the phase-fault unit for the first zone, but it is to be understood that similar modifications may be employed for the phase-fault units of zones 2 and 3.

In FIG. 1B the compensated three-phase voltages *xyz* at the terminals *xyz* are applied to a torque-producing element W. In FIG. 5 the same three-phase voltages *xyz* are applied to a positive-sequence-component filter 33 and a negative-sequence-component filter 35. These filters provide single-phase-voltage outputs representing respectively the positive and negative sequence-components of the voltages *xyz*. Such filters are well known in the art, examples being found in the Electrical Transmission and Distribution Reference Book, 3rd Edition, pages 247 to 249, published by the Westinghouse Electric and Manufacturing Company, East Pittsburgh, Pennsylvania, in 1944. The output of the filter 33 is rectified by a full-wave rectifier and the rectified output is applied across a relay coil 39R and a resistor 41 in series through a filter represented by a resistor 43 and capacitors 45.

In a similar manner the output of the filter 35 is rectified by a full-wave rectifier 47 and applied across a relay coil 39O and a resistor 49 through a filter represented by a resister 51 and capacitors 53.

The load represented by the filters preferably is balanced by a balancing impedance 55 in accordance with the principles set forth in my article "A Symmetrical Component Approach to Load Balancing" which appeared in the April 1960 issue of Electrical Engineering, a journal published by the American Institute of Electrical Engineers, New York City.

Referring again to FIG. 1A a compensated zero-sequence voltage appears between the terminals *e* and *f*. In FIG. 5 this voltage is applied across an adjustable voltage divider 58. The output of the voltage divider is rectified by a full-wave rectifier 57 and the rectified voltage is applied across the equal resistors 41 and 49 in series through a filter represented by a resistor 59 and capacitors 61.

It will be recalled that for a single-phase-fault-to-ground at the balance point the magnitude of the positive-sequence-component of voltage exceeds the negative-sequence-component of voltage by the magnitude of the zero-sequence-component of voltage. In FIG. 5 let $V_{OF}$ equal the magnitude of the zero-sequence-component of voltage at the balance point, let $V_1$ equal the magnitude of the positive-sequence-component and let $V_2$ equal the magnitude of the negative-sequence-component. The resultant voltage across the relay coil 39R is now $V_1 - \frac{1}{2}V_{OF}$ and that across the relay coil 39O is $V_2 + \frac{1}{2}V_{OF}$, and these two resultant voltages are equal. Consequently, a relay element responsive to the difference in energizations of the two coils properly responds to single-phase-to-ground faults on the protected line.

It will be assumed that the coil 39R is the restraining coil and the coil 39O is the operating coil of a polar relay 39. When the energization of the coil 39O exceeds that of the coil 39R by a predetermined amount the relay 39 picks up to close its front or make contacts. These contacts connect the trip coil TC across a source of direct current through the switch CB*a'* and parallel front or make contacts of relays SA, SB and SC which are the phase-selector relays identified by the same reference characters in FIG. 2. These phase-selector relays permit a tripping operation of the trip coil TC by the relay 39 only when a single-phase-to-ground fault occurs on the protected line section.

Figure 6:
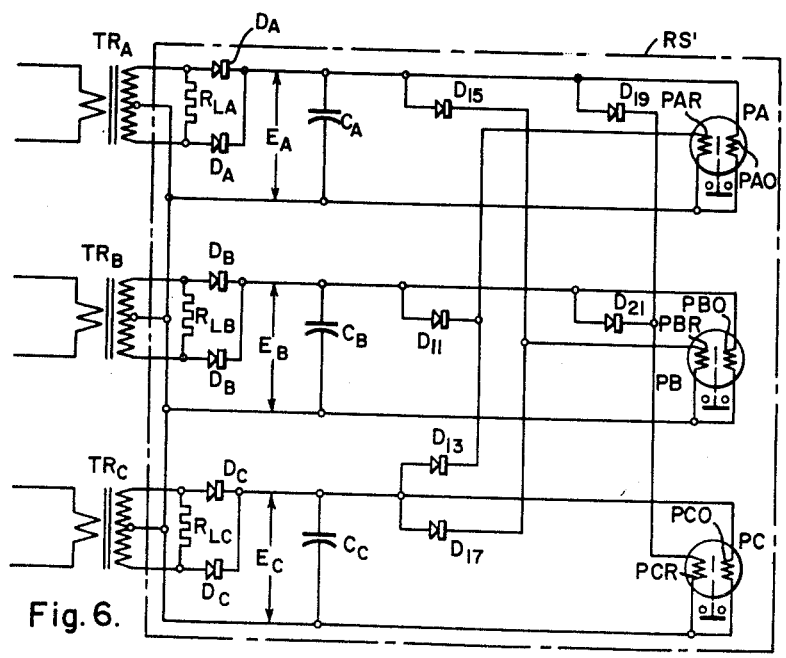

In FIGS. 2 and 3 the difference between an operating voltage and a restraining voltage is applied to each of the relays SA, SC and SB. In the embodiment of FIG. 6, the operating and restraining voltages are applied to the terminals of differential relays PA, PB and PC. These desirably may be polar-type differential relays.

Direct voltages $E_A$, $E_B$, and $E_C$ in FIG. 6 are applied across the capacitors $C_A$, $C_B$ and $C_C$ in precisely the same manner discussed for FIG. 2. The voltage $E_A$ across the the capacitor $C_A$ in FIG. 6 is applied across the operating winding PAO of the differential relay PA which has a restraining winding PAR. In a similar manner the voltages $E_B$ and $E_C$ are applied respectively to the operating windings of the differential relays PB and PC.

Each of the direct voltages $E_B$ and $E_C$ is connected across the restraining winding PAR through a separate rectifier, respectively $D_{11}$ or $D_{13}$. Consequently, the larger of these voltages is effective for restraining operation of the differential relay PA. The relay operates only if the difference between operating voltages and the larger of the restraining voltages exceeds a predetermined value.

In a similar manner the restraining winding PBR of the differential relay PB is energized effectively by the larger of the voltages $E_A$ and $E_C$. The restraining winding PCR of the differential relay PC is energized effectively by the larger of the voltages $E_A$ and $E_B$.

Thus, the relays PA, PB and PC may replace respectively the relays SA, SB and SC of FIG. 1A.

Although the invention has been described with reference to certain specific embodiments thereof, numerous modifications falling within the spirit and scope of the invention are possible.

I claim as my invention:

1. In a protective arrangement for a polyphase electrical system, a responding device having separate terminals for receiving first, second and third inputs, said device including controlled means having a non-operated condition and first, second and third operated conditions, and means effective only when the first input exceeds each of the remaining inputs for operating the controlled means into the first operated condition, said means being effective only when the second input exceeds each of the remaining inputs for operating the controlled means into the second operated condition, and said means being effective only when the third input exceeds each of the remaining inputs for operating the controlled means into the third operated condition.

2. In a protective arrangement for a polyphase electrical system, means for establishing first, second and third direct voltages dependent respectively on the magnitudes of first, second and third phase currents of a three-phase electrical system, first selective means for supplying a control output only when the first direct voltage exceeds each of the remaining direct voltages by at least a predetermined amount, second selective means for supplying a control output only when the second direct voltage exceeds each of the remaining direct voltages by at least a predetermined amount, and third selective means for supplying a control output only when the third direct voltage exceeds each of the remaining direct voltages by at least a predetermined amount.

3. In a protective arrangement for a three-phase electrical system having phase currents $I_A$, $I_B$ and $I_C$, means for deriving from said phase currents $I_A$, $I_B$ and $I_C$ three derived phase currents $I_a$, $I_b$ and $I_c$ respectively which have no zero-sequence-component of current, means for deriving three direct voltages $E_{D1}$, $E_{D2}$ and $E_{D3}$ which have magnitudes dependent respectively on the magnitudes of the derived phase currents $I_a$, $I_b$ and $I_c$, a circuit breaker for controlling the connection of said three-phase electrical system to a source of power, and means responsive to the direct voltage for tripping said circuit breaker only in response to occurrence of any one of the following three relations of the direct voltages:
  (1) The direct voltage $E_{D1}$ exceeds each of the direct voltages $E_{D2}$ and $E_{D3}$ by at least a predetermined amount;
  (2) The direct voltage $E_{D2}$ exceeds each of the direct voltages $E_{D1}$ and $E_{D3}$ by at least a predetermined amount;
  (3) The direct voltage $E_{D3}$ exceeds each of the direct voltages $E_{D1}$ and $E_{D2}$ by at least a predetermined amount.

4. In a protective arrangement for a three-phase electrical system having phase currents $I_A$, $I_B$ and $I_C$, means for deriving from said phase currents $I_A$, $I_B$ and $I_C$ three derived phase currents $I_a$, $I_b$ and $I_c$ respectively which have no zero-sequence-component of current, means for deriving three direct voltages $E_{D1}$, $E_{D2}$ and $E_{D3}$ which have magnitudes dependent respectively on the magnitudes of the derived phase currents $I_a$, $I_b$ and $I_c$, first, second and third relay elements, circuit means for energizing the first relay element in accordance with the difference between the voltage $E_{D1}$ and the larger of the voltages $E_{D2}$ and $E_{D3}$, circuit means for energizing the second relay element in accordance with the difference between the voltage $E_{D2}$ and the larger of the voltages $E_{D1}$ and $E_{D3}$, and circuit means for energizing the third relay element in accordance with the difference between the voltage $E_{D3}$ and the larger of the voltages $E_{D1}$ and $E_{D2}$.

5. In a protective arrangement for a polyphase system, means for deriving at a first point on the system quantities representing the positive-sequence-component, the negative-sequence-component and the zero-sequence-component of voltage at a predetermined second point in the polyphase system spaced from the first point, a differential element having terminals for receiving two inputs to which the differential element is differentially responsive for operation from a first to a second condition, circuit means for supplying as a first one of said inputs a quantity dependent on the difference between said positive-sequence-component quantity and one-half of said zero-sequence-component quantity, and circuit means for supplying as a second one of said inputs a quantity dependent on the sum of said negative-sequence-component quantity and one-half of said zero-sequence-component quantity.

6. In a protective arrangement for a polyphase system, means for deriving at a first point on the system quantities representing the positive-sequence-component, the negative-sequence-component and the zero-sequence-component of voltage at a predetermined second point in the polyphase system spaced from the first point, a differential element having terminals for receiving two inputs to which the differential element is differentially responsive for operation from a first to a second condition, first circuit means for supplying as a first one of said inputs a quantity dependent on the difference between said positive-sequence-component quantity and one-half of said zero-sequence-component quantity, second circuit means for supplying as a second one of said inputs a quantity dependent on the sum of said negative-sequence-component quantity and one-half of said zero-sequence-component quantity, a circuit breaker for connecting the polyphase system to a source of power, and third circuit means responsive when in effective condition to operation of the differential element to the second condition for tripping the circuit breaker, said circuit means including fault means responsive to a single-phase-to-ground fault on the polyphase system for placing the third circuit means in effective condition only if a single-phase-to-ground fault is present on the polyphase system.

7. In a protective arrangement for a polyphase electrical system, relay means having terminals for connection to a polyphase electrical system to be protected, said relay means being responsive to phase-to-phase fault conditions occurring on a polyphase electrical system connected to said terminals and having an incorrect response to single-phase-to-ground fault conditions occurring on such systems, and modifying means responsive to a single-phase-to-ground fault condition of a polyphase electrical system connected to said terminals for modifying the energization of said relay means to cause said relay means to respond correctly to such single-phase-to-ground fault condition.

8. In a protective arrangement for a polyphase electrical system, relay means having terminals for connection to a polyphase electrical system to be protected, said relay means being responsive to phase-to-phase fault conditions occurring on a polyphase electrical system connected to said terminals and having an incorrect response to single-phase-to-ground fault conditions occurring on such systems, and modifying means responsive to single-phase-to-ground fault condition of a polyphase electrical system connected to said terminals for modifying the energization of said relay means to cause said relay means to respond correctly to such single-phase-to-ground fault condition, said modifying means comprising phase-selector means for selecting the phase of a polyphase electrical system which is subjected to a single-phase-to-ground fault, and sequence segregating means effective upon occurrence of a single-phase-to-ground fault for segregating a quantity representing the zero-sequence component of voltage at a predetermined point of a polyphase electrical system and introducing such quantity into that phase of the relay means corresponding to the phase selected by the phase-selector means.

9. A protective-relaying combination for a relaying station on a three-phase transmission-line, including: a means, energized from the line-voltage at the relaying station, for producing a derived polyphase voltage for relaying purposes; a line-drop compensating-means, connected in series-circuit relation to said derived polyphase voltage, for producing a polyphase compensated relaying voltage, which collapses to a single phase when a phase-to-phase fault occurs at some predetermined fault-location spaced along the transmission line from the relaying station which has the same positive sequence of phases as the transmission-line when said phase-to-phase fault occurs at a point beyond said predetermined fault-location, and which has a negative sequence of phases when said phase-to-phase fault occurs at a point nearer than said predetermined fault-location; a polyphase-responsive relaying element, energized from said polyphase compensated relaying voltage, for controlling an electrical circuit when the polyphase compensated relaying voltage has a negative sequence of phases; phase-selector means responsive to a single-phase-to-ground fault occurring on the transmission line for selecting the phase on which such fault occurs; and modifying means responsive to operation of the phase-selector means for introducing into that phase of the polyphase-responsive relaying element which corresponds to the phase on which the single-phase-to-ground fault occurs on additional energization corresponding to the zero-phase-sequence-component of voltage present in the transmission line.

10. A protective-relaying combination for a relaying station on a three-phase transmission-line, including: a means, energized from the line-voltage at the relaying station, for producing a derived polyphase voltage for relaying purposes; a line-drop compensating-means, connected in series-circuit relation to said derived polyphase voltage, for producing a polyphase compensated relaying voltage, which collapses to a single phase when a phase-to-phase fault occurs at some predetermined fault-location spaced along the transmission line from the relaying station, which has the same positive sequence of phases as the transmission-line when said phase-to-phase fault occurs at a point beyond said predetermined fault-location, and which has a negative sequence of phases when said phase-to-phase fault occurs at a point nearer than said predetermining fault-location; and a polyphase-responsive relaying element, energized from said polyphase compensated relaying voltage, for controlling an electrical circuit when the polyphase compensated relaying voltage has a negative sequence of phases, means energized from the line-voltage at the relaying station for producing a zero-sequence component of the polyphase voltage; means energized from the line-current at the relaying station for producing a zero-sequence-component of the transmission-line currents, phase-selector means responsive to a single-phase-to-ground fault occurring on the transmission line for selecting the phase on which such fault occurs, and modifying means responsive to operation of the phase-selector means for introducing into that phase of the polyphase-responsive relaying element which corresponds to the phase on which the single-phase-to-ground fault occurs an additional energization corresponding to said zero-sequence component of polyphase voltage compensated by the voltage drop produced by applying said zero-sequence-component of the transmission-line currents to said line-drop compensating means.

11. A protective-relaying combination for a relaying station on a three-phase transmission-line, including: a means, energized from the line-voltage at the relaying station, for producing a derived polyphase voltage for relaying purposes; a line-drop compensating-means, connected in series-circuit relation to said derived polyphase voltage, for producing a polyphase compensated relaying voltage, which collapses to a single phase when a phase-to-phase fault occurs at said predetermined fault-location, which has the same positive sequence of phases as the transmission-line when said phase-to-phase fault occurs at a point beyond said predetermined fault-location, and which has a negative sequence of phases when said phase-to-phase fault occurs at a point nearer than said predetermined fault-location; and a relaying element which is energized from said polyphase compensated relaying voltage for controlling an electrical circuit when the polyphase compensated relaying voltage has a negative sequence of phases; means energized from the line-voltage at the relaying station for producing a zero-sequence component of the polyphase voltage; means energized from the line-currents at the relaying station for producing a zero-sequence-component of the transmission-line currents, line-drop compensating means energized by said zero-sequence-component of the transmission line currents and connected in series-circuit relation to said zero-sequence component of the polyphase voltage, for reproducing some aspect of the zero-sequence component of the polyphase voltage at some predetermined fault-location in the transmission-line, whereby to produce a zero-sequence compensated relaying voltage; phase-selector means responsive to a single-phase-to-ground fault occurring on the transmission line for selecting the phase on which such fault occurs, and modifying means responsive to operation of the phase-selector means for introducing into that phase of the polyphase-responsive relaying element which corresponds to the phase on which the single-phase-to-ground fault occurs on additional energization corresponding to said zero-sequence compensated relaying voltage.

12. A protective-relaying combination for a relaying station on a three-phase transmission-line, including: a means, energized from the line-voltage at the relaying station, for producing a derived polyphase voltage for relaying purposes; a line-drop compensating-means, connected in series-circuit relation to said derived polyphase voltage, for reproducing some aspect of the three-phase line-voltage at some predetermined fault-location in the transmission-line, whereby to produce a polyphase compensated relaying voltage, which collapses to a single phase when a phase-to-phase fault occurs at said predetermined fault-location, which has the same positive sequence of phases at the transmission-line when said phase-to-phase fault occurs at a point beyond said predetermined fault-location, and which has a negative sequence of phases when said phase-to-phase fault occurs at a point nearer than said predetermined fault-location; a polyphase-responsive relaying element, energized from said polyphase compensated relaying voltage, for controlling an electrical circuit when the polyphase compensated relaying voltage has a negative sequence of phases; phase-selector means responsive to a single-phase-to-ground fault occurring on the transmission line for selecting the phase on which such fault occurs, and for selecting the unfaulted phase for a two-phase-to-ground fault occurring on the transmission line; and modifying means responsive to operation of the phase-selector means for introducing into that phase of the polyphase-responsive relaying element which corresponds to the phase on which the single-phase-to-ground fault occurs, and into that phase of the polyphase-responsive relaying element which corresponds to the unfaulted phase for a two-phase-to-ground fault occurring on the transmission line on additional energization corresponding to the zero-phase-sequence-component of voltage present in the transmission-line at a point displaced from the relaying station.

13. A compensated-voltage relaying unit for a relaying station on a three-phase transmission-line, said unit including: a voltage-deriving means, energized from the line-voltage at the relaying station, for producing a set of derived polyphase voltages having a phase-sequence corresponding to the line-voltages; a set of three compensators, connected in series-circuit relation to the respective phases of said derived polyphase voltages, and energized proportionately to the respective line-currents in the corresponding line-wires of the transmission-line; each of said three compensators having an effective impedance-angle which is substantially the same as the impedance-angle of the transmission-line; a polyphase-responsive relaying element, energized from said compensated polyphase voltages, for controlling an electrical circuit when the compensated polyphase voltages have a negative sequence of phases; phase selector means responsive to a two-phase-to-ground fault occurring on the transmission line for selecting the unfaulted phase of the transmission line; and modifying means responsive to operation of the phase-selector means for introducing into that phase of the polyphase-responsive relaying element which corresponds to said unfaulted phase an additional energization dependent on the zero-sequence component of voltage present in the transmission-line.

14. A compensated-voltage phase-fault relaying unit for responding to line-to-line faults which occur across any one of the three pairs of line-phases of a three-phase transmission-line, said unit including: a means, energized from the line-voltage at the relaying station, for producing a set of derived polyphase voltages having a phase-sequence corresponding to the line-voltages; a set of three line-drop compensators, connected in series-circuit relation to the respective phases of said derived polyphase voltages, and energized proportionately to the respective line-currents in the corresponding line-wires of the transmission-line, each compensator having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from said compensated polyphase voltages, for controlling an electrical circuit when the compensated polyphase voltages have a negative sequence of phases; means energized from the line-voltage at the relaying station for producing a zero-sequence-component of the polyphase voltage; compensating means for compensating said zero-sequence-component to produce a compensated-zero-sequence-component of the polyphase voltage at the predetermined fault location, and phase-selector means responsive to a single-phase-to-ground fault on the transmission-line for introducing an additional energization corresponding to the compensated-zero-sequence-component into the phase of the polyphase-responsive relaying element which corresponds to the faulted phase of the transmission line.

15. A compensated-voltage phase-fault relaying unit for responding to line-to-line faults which occur across any one of the three pairs of line-phases of a three-phase transmisison-line, said unit including: a means, energized from the line-voltage at the relaying station, for producing a set of derived polyphase voltages having a phase-sequence corresponding to the line-voltages; a set of three line-drop compensators, connected in series circuit relation to the respective phases of said derived polyphase voltages, and energized proportionately to the respective line-currents in the corresponding line-wires of the transmission-line, each compensator having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from said compensated polyphase voltages, for controlling an electrical circuit when the compensated polyphase voltages have a negative sequence of phases; means energized from the line-voltage at the relaying station for producing a zero-sequence-component of the polyphase voltage; compensating means for compensating said zero-sequence-component to produce a compensated-zero-sequence-component of the polyphase voltage at the predetermined fault-location, and phase-selector means responsive to a single-phase-to-ground fault on the transmission-line for introducing an additional energization corresponding to the compensated-zero-sequence-component into the phase of the polyphase-responsive relaying element which corresponds to the faulted phase of the transmission line, said compensating means comprising a line-drop compensator connected in series circuit relation to said zero-sequence-component of polyphase voltage, and means for energizing the compensator in accordance with the zero-sequence-component of said polyphase voltage, said last-named compensator having an impedance equivalent to the zero-sequence line impedance to said predetermined fault-location; and said phase-selector means comprising operating means for each of the lines which is responsive to the difference in magnitude between the associated line current and each of the remaining line currents for operation only if such associated line current exceeds in magnitude each of the remaining line currents by at least a predetermined amount, whereby for a single phase-to-ground fault only the operating means associated with the faulted phase operates.

16. A protective-relaying combination for protecting a three-phase transmission-line against all faults, which occur on the transmission-line between the relaying station and a predetermined fault-location on the line; said combination including a compensated-voltage phase-fault relaying unit including: a means, energized from the line-voltage at the relaying station, for producing a set of derived polyphase voltages having a phase-sequence corresponding to the line-voltages; a set of three line-drop compensators, connected in series-circuit relation to the respective phases of said derived polyphase voltages, and energized proportionately to the respective line-currents in the corresponding line-wires of the transmission-line, each compensator having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from said compensated polyphase voltages, for controlling an electrical circuit when the compensated polyphase voltages have a negative sequence of phases; in combination with a three-phase fault-responsive relaying means which responds to all other faults, involving more than one line-phase, which occur on the transmission line between the relaying station and substantially the same predetermined fault-location on the line; means energized from the line-voltage at the relaying station for producing a zero-sequence-component of the polyphase voltage; compensating means for compensating said zero-sequence-component to produce a compensated-zero-sequence-component of the polyphase voltage at the predetermined fault location, and phase-selector means responsive to a single-phase-to-ground fault on the transmission-line for introducing an additional energization corresponding to the compensated-zero-sequence-component into the phase of the polyphase-responsive relaying element which corresponds to the faulted phase of the transmission line, said compensating means comprising a line-drop compensator, connected in series circuit relation to said zero-sequence-component of polyphase voltage, and means for energizing the compensator in accordance with the zero-sequence-component of said polyphase voltage, said last-named compensator having an impedance equivalent to the zero-sequence line impedance to said predetermined fault-location; and said phase-selector means comprising operating means for each of the lines which is responsive to the difference in magnitude between the associated line current and each of the remaining line currents for operation only if such associated line current exceeds in magnitude each of the remaining line currents by at least a predetermined amount, whereby for a single-phase-to-ground fault only the operating means associated with the faulted phase operates; and a relay-controlled circuit-means for performing a fault-protective function for the transmission-line, in response to either said phase-fault relaying unit or said three-phase fault-responsive relaying means.

References Cited by the Examiner
UNITED STATES PATENTS

| | | | |
|---|---|---|---|
| 2,296,784 | 9/42 | Harder | 317—47 |
| 2,406,411 | 8/46 | Sonnemann | 317—47 |
| 2,965,810 | 12/60 | Claybourn | 317—52 |
| 3,024,389 | 3/62 | Warrington | 317—47 |

SAMUEL BERNSTEIN, *Primary Examiner.*